(12) United States Patent
Yang et al.

(10) Patent No.: US 9,722,994 B2
(45) Date of Patent: Aug. 1, 2017

(54) USER TERMINAL FOR PASSWORD-BASED AUTHENTICATION, AND PASSWORD-BASED TRADING TERMINAL, SYSTEM, AND METHOD

(75) Inventors: Jie Yang, Shenzhen (CN); Qihong Fu, Shenzhen (CN); Yong Fan, Shenzhen (CN); Pan Wei, Shenzhen (CN); Dong Zhao, Shenzhen (CN); Yuan Zhu, Shenzhen (CN); Zhiping Zhang, Shenzhen (CN)

(73) Assignee: ZTE Corporation (CN)

( * ) Notice: Subject to any disclaimer, the term of this patent is extended or adjusted under 35 U.S.C. 154(b) by 0 days.

(21) Appl. No.: 14/391,789

(22) PCT Filed: May 11, 2012

(86) PCT No.: PCT/CN2012/075342
§ 371 (c)(1),
(2), (4) Date: Oct. 10, 2014

(87) PCT Pub. No.: WO2013/152540
PCT Pub. Date: Oct. 17, 2013

(65) Prior Publication Data
US 2015/0082403 A1 Mar. 19, 2015

(30) Foreign Application Priority Data
Apr. 12, 2012 (CN) .......................... 2012 1 0107171

(51) Int. Cl.
*G06F 7/04* (2006.01)
*H04L 29/06* (2006.01)
(Continued)

(52) U.S. Cl.
CPC ............ *H04L 63/083* (2013.01); *G06F 21/35* (2013.01); *G06Q 20/3278* (2013.01);
(Continued)

(58) Field of Classification Search
CPC .............. H04L 63/0492; H04L 63/083; H04L 63/0846; H04W 12/06; H04W 4/008;
(Continued)

(56) References Cited

U.S. PATENT DOCUMENTS 8,600,380 B2 * 12/2013 Choi ................. H04M 1/72583
370/242
2004/0124966 A1 * 7/2004 Forrest ................... G06Q 20/32
340/5.8
(Continued)

FOREIGN PATENT DOCUMENTS

| CN | 101561953 | 10/2009 |
|---|---|---|
| CN | 102096972 | 6/2011 |
| CN | 102122342 | 7/2011 |

OTHER PUBLICATIONS

Extended European Search Report for EP 12874343.2, Completed by the European Patent Office, Dated Feb. 23, 2015, 6 Pages.
(Continued)

*Primary Examiner* — Gary Gracia
(74) *Attorney, Agent, or Firm* — Brooks Kushman P.C.

(57) ABSTRACT

A user terminal, a password-based trading terminal, a system and a method for password-based authentication are provided. Wherein, the user terminal comprises a password generation module and a first near field communication module. The password generation module is configured to generate a password. The first near field communication module is configured to convert the generated password into near field communication label data, and then send the data to a password-based trading terminal through near field communication. The present application effectively ensures password security during the password-based authentication.

3 Claims, 2 Drawing Sheets

(51) Int. Cl.
*H04W 12/06* (2009.01)
*G06Q 20/32* (2012.01)
*G06Q 20/40* (2012.01)
*H04B 5/00* (2006.01)
*H04W 4/00* (2009.01)
*G06F 21/35* (2013.01)
*G06F 15/16* (2006.01)

(52) U.S. Cl.
CPC ....... *G06Q 20/4012* (2013.01); *H04B 5/0056* (2013.01); *H04W 4/008* (2013.01); *H04W 12/06* (2013.01); *H04L 63/0492* (2013.01); *H04L 63/0846* (2013.01)

(58) Field of Classification Search
CPC ........... G06Q 20/3278; G06Q 20/4012; H04B 5/0056; G06F 21/35; G06F 3/04842; G06F 3/04845; G06F 3/0488
USPC .............................................................. 726/7
See application file for complete search history.

(56) References Cited

U.S. PATENT DOCUMENTS

| | | | |
|---|---|---|---|
| 2005/0046880 A1* | 3/2005 | Asai ................... G03G 15/5091 | 358/1.6 |
| 2005/0242921 A1* | 11/2005 | Zimmerman ...... G07C 9/00031 | 340/5.2 |
| 2006/0085846 A1* | 4/2006 | Uno ......................... G06F 21/10 | 726/6 |
| 2006/0143706 A1 | 6/2006 | Kawasaki et al. | |
| 2007/0162597 A1* | 7/2007 | Tanaka et al. ................ 709/224 | |
| 2008/0098466 A1* | 4/2008 | Yoshida .................. G06F 21/35 | 726/5 |
| 2008/0191816 A1* | 8/2008 | Balachandran ......... H04L 47/10 | 333/24 R |
| 2009/0034731 A1* | 2/2009 | Oshima .................. G06F 21/608 | 380/270 |
| 2009/0104888 A1* | 4/2009 | Cox ........................ G06F 21/31 | 455/410 |
| 2009/0143104 A1* | 6/2009 | Loh et al. ...................... 455/558 | |
| 2009/0178115 A1* | 7/2009 | Fiske ....................... G06F 21/32 | 726/2 |
| 2009/0200371 A1* | 8/2009 | Kean ........................ G06F 21/31 | 235/379 |
| 2009/0287936 A1* | 11/2009 | Ohkado ......................... 713/183 | |
| 2009/0307767 A1* | 12/2009 | Semba ..................... G06F 21/34 | 726/18 |
| 2010/0046553 A1* | 2/2010 | Daigle ..................... G06F 21/35 | 370/474 |
| 2010/0107229 A1* | 4/2010 | Najafi ..................... G06F 21/35 | 726/6 |
| 2010/0180326 A1 | 7/2010 | Sheets et al. | |
| 2010/0218241 A1* | 8/2010 | Faryna .................... G06F 21/35 | 726/5 |
| 2011/0078549 A1* | 3/2011 | Thueringer ........... H04L 9/3271 | 714/807 |
| 2011/0131639 A1* | 6/2011 | Buhler .................... G06F 21/34 | 726/6 |
| 2011/0212707 A1* | 9/2011 | Mahalal ................. G06Q 20/32 | 455/411 |
| 2011/0251962 A1* | 10/2011 | Hruska .............. G06Q 20/0457 | 705/72 |
| 2011/0281556 A1* | 11/2011 | Choi ................. H04M 1/72583 | 455/411 |
| 2012/0047071 A1* | 2/2012 | Mullen et al. .................. 705/44 | |
| 2012/0084210 A1 | 4/2012 | Farahmand | |
| 2012/0108208 A1* | 5/2012 | Willis .................. H04L 63/0853 | 455/411 |
| 2012/0134309 A1* | 5/2012 | Sakai ................ H04W 52/0206 | 370/311 |
| 2012/0166337 A1* | 6/2012 | Park et al. ...................... 705/44 | |
| 2012/0221859 A1* | 8/2012 | Marien ................... G06F 21/34 | 713/172 |
| 2012/0227096 A1* | 9/2012 | Edwards ........................... 726/7 | |
| 2012/0239572 A1* | 9/2012 | Wolfs .................... G06Q 20/20 | 705/44 |
| 2012/0265988 A1* | 10/2012 | Ehrensvard .................. 713/165 | |
| 2012/0323690 A1* | 12/2012 | Michael ................ G06Q 30/02 | 705/14.58 |
| 2013/0046697 A1* | 2/2013 | Schibuk ........................ 705/67 | |
| 2013/0046881 A1* | 2/2013 | Seelman ............. H04L 12/2809 | 709/224 |
| 2013/0110728 A1* | 5/2013 | Kobres ................... G06Q 30/06 | 705/75 |
| 2013/0133086 A1* | 5/2013 | Liberman ................ G09C 5/00 | 726/28 |
| 2013/0171967 A1* | 7/2013 | Ashour ............... H04M 1/7253 | 455/411 |
| 2013/0203346 A1* | 8/2013 | Han .................... H04M 1/7253 | 455/41.1 |

OTHER PUBLICATIONS

International Search Report for PCT/CN2012/075342, English translation attached to original, Both completed by the Chinese Patent Office on Dec. 25, 2012, All together 5 Pages.

* cited by examiner

USER TERMINAL FOR PASSWORD-BASED AUTHENTICATION, AND PASSWORD-BASED TRADING TERMINAL, SYSTEM, AND METHOD

CROSS-REFERENCE TO RELATED APPLICATION

This application is the U.S. national phase of PCT Appln. No. PCT/CN2012/075342 filed May 11, 2012 which claims priority to Chinese Application No. 201210107171.5 filed Apr. 12, 2012, the disclosures of which are incorporated in their entirety by reference herein.

TECHNICAL FIELD

The present document relates to the password-based authentication field, and in particular, to a user terminal, a password-based trading terminal, a system and a method for password-based authentication.

BACKGROUND OF THE RELATED ART

The near field communication (NFC) is a kind of short distance wireless communication technology, having the characteristics of fast, safe and simple. The NFC has 3 kinds of work modes, including a NFC card simulation mode, a read/write mode, and a Peer-to-Peer communication mode. Under the NFC card simulation mode, the near field communication module can be simulated into a non-contact IC card of which the bottom layer is compatible with the ISO14443 A or the ISO14443 B standard, which performs the data interaction with the external reader. Under the read/write mode, the near field communication module can be simulated into a non-contact IC card reader of which the bottom layer is compatible with the ISO14443 A or the ISO15693 standard, which can read the non-contact IC card supporting these standards. Under the Peer-to-Peer communication mode, the near field communication mobile phone can establish the near field communication link with the device having the near field communication capacity likewise, to perform the information exchange and data exchange, etc.

Because the current mode for the user to perform the password-based authentication is usually to perform the password input in the password input equipment provided by the service provider directly, and because the password input equipment is opened to the public, it is very easy to install the hidden camera or the password stealing device by the lawless person, which brings the hidden danger for password security of the public; meanwhile, because the password is typed in live, the password is easy to expose to the lawless person.

SUMMARY

The present document provides a user terminal, a password-based trading terminal, a system and a method for password-based authentication, to solve the technical problem on how to endure the password security.

In order to solve the above-mentioned technical problem, the present document provides a user terminal for password-based authentication, comprising a password generation module and a first near field communication module, wherein, the password generation module is configured to generate a password; and the first near field communication module is configured to convert a generated password into near field communication label data, and then send to a password-based trading terminal through near field communication.

Preferably, the system further comprises a first password management module;

the password generation module is further configured to: when the password is generated, send a trigger signal to the first password management module; and the first password management module is configured to: set a valid time of the password and begin to time under the trigger of the password generation module, and detect whether the first near field communication module finishes sending the near field communication label data when the valid time is reached, if the first near field communication module does not finish sending the near field communication label data within the valid time, then notify the first near field communication module to delete the data not sent to the password-based trading terminal, and trigger the password generation module to regenerate the password.

Preferably, the first password management module is further configured to: when detecting that the first near field communication module finishes sending the near field communication label data when the valid time is reached, judge whether the password generation module stores the generated password, and delete the stored password if the generated password is stored.

In order to solve the above-mentioned technical problem, the present document further provides a password-based trading terminal for password-based authentication, comprising a second near field communication module and a password authorization module, wherein, the second near field communication module is configured to: restore near field communication label data sent by a user terminal through near field communication to the password and then send to the password authorization module; and the password authorization module is configured to: verify validity of the data from the second near field communication module.

Preferably, the password-based trading terminal further comprises a second password management module, wherein, the second password management module is configured to: after knowing that the password authorization module finishes a verification, delete the verified password stored in the password authorization module.

In order to solve the above-mentioned technical problem, the present document further provides a password-based authentication system, comprising a user terminal and a password-based trading terminal, wherein, the user terminal adopts the above-described user terminal; and the password-based trading terminal adopts the above-described password-based trading terminal.

In order to solve the above-mentioned technical problem, the present document further provides a method for password-based authentication, used for a user terminal, comprising:

generating a password; and converting a generated password into near field communication label data, and then sending to a password-based trading terminal through near field communication.

Preferably, the method further comprises:

setting a valid time of the password and beginning to time after the password is generated, and detecting whether sending the near field communication label data is finished after the valid time is reached; if sending the near field communication label data is not finished within the valid time, then deleting the data not sent to the password-based trading terminal, and regenerating the password.

Preferably, the method further comprises:

when detecting that sending the near field communication label data is finished after the valid time is reached, continuing judging whether the password is stored after the password is generated; and deleting the stored password if the password is stored after the password is generated.

Preferably, the converting a generated password into near field communication label data and then sending to a password-based trading terminal through near field communication further comprises:

converting the password from a password input submodule to the near field communication label data; and sending the near field communication label data to the password-based trading terminal through the near field communication.

In order to solve the above-mentioned technical problem, the present document further provides a method for password-based authentication, used for a password-based trading terminal, comprising:

restoring near field communication label data sent by a user terminal through near field communication to the password; and verifying validity of the password.

Preferably, the method further comprises:

deleting the verified password after verifying the validity of the password.

In order to solve the above-mentioned technical problem, the present document further provides a method for password-based authentication, used for a user terminal and a password-based trading terminal, comprising:

the user terminal performing the password-based authentication by adopting the above-described method; and the password-based trading terminal performing the password-based authentication by adopting the above-described method.

The above-mentioned technical scheme transmits the password to the password-based trading terminal through the near field communication; the password is transparent to the external world, which lowers the risk that the password is stolen greatly; at the same time the device generating the password is the user terminal itself, which can avoid the password leaking caused by that the lawless person installs the steal apparatus to the password generation device.

PREFERRED EMBODIMENTS

In order to make the objective, technical scheme and advantage of the present document much more clear and obvious, the embodiment of the present document is described in detail with reference to the accompanying drawings hereinafter. It should be illustrated that, in the case of not conflicting, the embodiments in the present application and features in these embodiments can be combined with each other.

Figure 1:
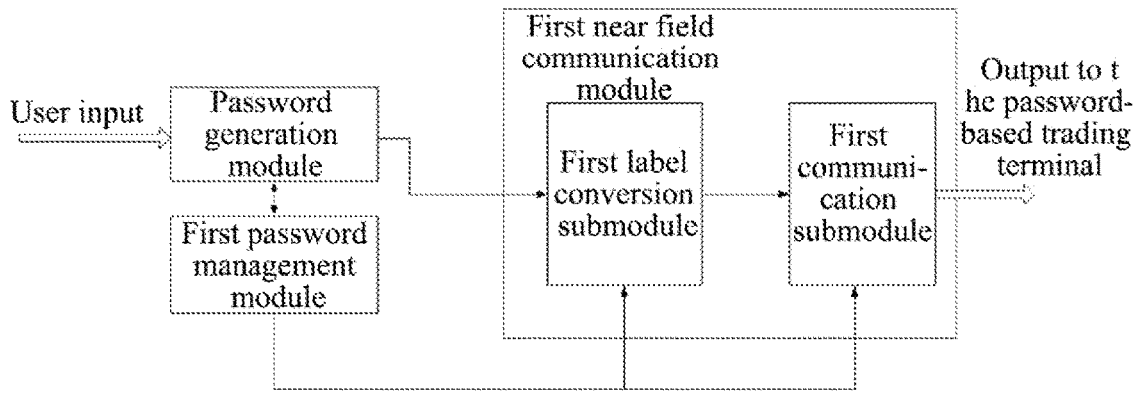
FIG. 1 is a constitution module diagram of a user terminal for password-based authentication of the present embodiment.

FIG. 1 is a constitution module diagram of a user terminal for password-based authentication of the present embodiment.

The user terminal includes a password generation module and a first near field communication module, wherein, the password generation module is configured to generate a password;

the password generation module can have a user interface (UI) for human-computer interaction, which provides a numeric keyboard for the user to input the password, a screen for displaying the operation guidance message, etc.; and the first near field communication module is used to convert a generated password into near field communication label data, and then send to a password-based trading terminal through near field communication.

The first near field communication module can be composed of a first label conversion submodule and a first communication submodule, wherein:

the first label conversion submodule is used for converting the password from the password input submodule to the near field communication label data, and sending the near field communication label data to the first communication submodule; and the first communication submodule is used for sending the near field communication label data to the password-based trading terminal through the near field communication.

In other embodiments, the user terminal can further include a first password management module;

at this time, the password generation module is configured to: after the password is generated, send a trigger signal to the first password management module; and the first password management module is configured to: set a valid time of the password and begin to time under the trigger of the password generation module, and detect whether the first near field communication module finishes sending the near field communication label data when the valid time is reached, if the first near field communication module does not finish sending the near field communication label data within the valid time, then notify the first near field communication module to delete the data not sent to the password-based trading terminal, and trigger the password generation module to regenerate a password.

The first password management module is further configured to: when detecting that the first near field communication module finishes sending the near field communication label data after the valid time is reached, judge whether the password generation module stores the generated password, and delete the stored password if the generated password is stored.

The above-mentioned first password management module, through setting the valid time of the password, avoids that the user is effective for a long time and stolen and used by others, which causes the password security problem.

The function module of the above-mentioned application terminal is further described in details with a specific application example hereinafter.

The application terminal includes a password generation module, a first near field communication module and a first password management module; the first near field communication module further includes a first label conversion submodule and a first communication sub module.

The password generation module is used to display the "input password" information to the user through its UI interface; after receiving the password input by the user, wait for the user to issue "send" command through the UI interface, and after receiving the "send" command issued by the user through the UI interface, display "close the password-based trading terminal" information to the user through the user UI interface; and send the received user input password to the first label conversion submodule, and send the trigger signal to the first password management module at the same time; after receiving the trigger signal from the first password management module, display the "input the password again" to the user through the UI interface, and wait to receive the password input by the user.

The first label conversion submodule is used to convert the password from the password generation module into the near field communication label data suitable for the near field communication transmission, and send the label data to the first communication submodule.

The first communication submodule is used to establish the near field communication connection with the password-based trading terminal, and send the near field communication label data to the password-based trading terminal through the connection.

The first password management module is used to receive the trigger signal from the password input submodule, and then set the valid time of the password as 5 seconds and begin to time, detect whether the first communication submodule finishes sending the near field communication label data after 5 seconds, if detecting that the first communication submodule does not finish sending the near field communication label data, notify the first communication submodule to delete the near field communication label data, and trigger the password generation module to regenerate a password; if detecting that the first communication submodule finishes sending the near field communication label data, judge whether the password input submodule stores the password input by the user through the UI interface, and delete the stored password if the password input submodule stores the password input by the user through the UI interface.

Figure 2:
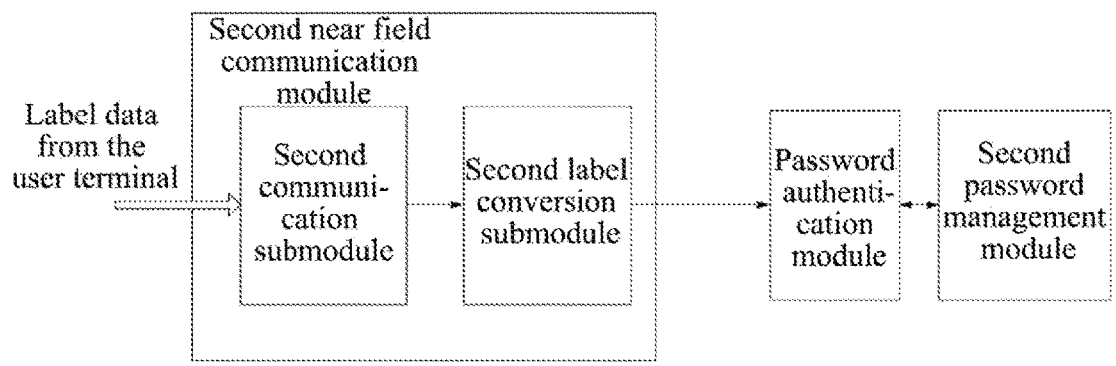
FIG. 2 a constitution module diagram of a password-based trading terminal for the password-based authentication of the present embodiment.

FIG. 2 is a constitution module diagram of a password-based trading terminal for the password-based authentication of the present embodiment.

The password-based trading terminal includes a second near field communication module and a password authorization module, wherein, the second near field communication module is configured to: restore near field communication label data sent by a user terminal through near field communication to the password and then send to the password authorization module;

the second near field communication module can be composed of a second label conversion submodule and a second communication submodule, wherein, the second communication submodule is used to receive the near field communication label data sent from the user terminal through the near field communication, and send the near field communication label data to the second label conversion submodule;

the second label conversion submodule is used to restore the near field communication label data to the password, and send the password to the password authorization module;

the password authorization module is used to: verify validity of the data from the second near field communication module; and the password authorization module can verify the validity of the data from the second near field communication module through interacting with a far-end server connected with the password-based trading terminal.

In other embodiments, the password-based trading terminal can further include a second password management module, used to: after knowing that the password authorization submodule finishes the verification, delete the verified password stored in the password authorization module. Deleting the verified password is to clean the password trace, which further ensures the security of the password.

The present embodiment further provides a password-based authentication system, including a user terminal and a password-based trading terminal, wherein, the user terminal can adopt the user terminal recorded in the above-mentioned embodiment, of which the composition structure refers to FIG. 1; and the password-based trading terminal can adopt the password-based trading terminal recorded in above-mentioned embodiment, of which the composition structure refers to FIG. 2.

Figure 3:
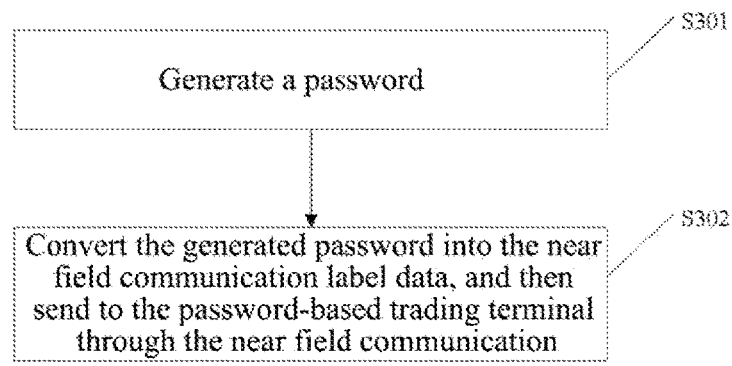
FIG. 3 is a flow chart of a method for the user terminal to perform the password-based authentication of the present embodiment.

FIG. 3 is a flow chart of a method for the user terminal to perform the password-based authentication of the present embodiment.

In S301, a password is generated.

In S302, the generated password is converted into the near field communication label data, and then sent to the password-based trading terminal through the near field communication.

The step S302 can include:

converting the password from the password input submodule into the near field communication label data; and sending the near field communication label data to the password-based trading terminal through the near field communication.

In other embodiments, a valid time of the password further can be set and it begins to time after the password is generated, and it is detected whether sending the near field communication label data is finished after the valid time is reached; if sending the near field communication label data is not finished within the valid time, then the data not sent to the password-based trading terminal are deleted, and the step S301 is executed again.

If detecting that sending the near field communication label data is finished after the valid time is reached, it continues judging whether the password is stored after the password is generated; and it deletes the stored password if the password is stored after the password is generated.

Figure 4:
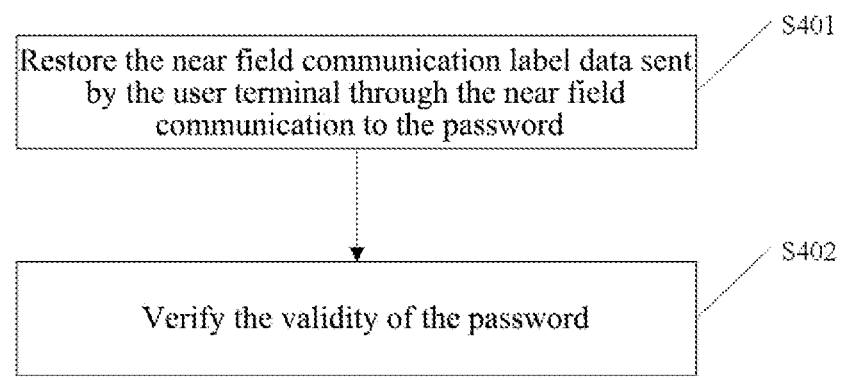
FIG. 4 is a flow chart of a method for the password-based trading terminal to perform the password-based authentication of the present embodiment.

FIG. 4 is a flow chart of a method for the password-based trading terminal to perform the password-based authentication of the present embodiment.

In S401, the near field communication label data sent by the user terminal through the near field communication are restored to the password.

In S402, the validity of the password is verified.

In order to further ensure the security of the password, the verified password can be deleted after verifying the validity of the password, and the password trace is cleaned.

The present embodiment further provides a method for password-based authentication, used for a user terminal and a password-based trading terminal. In the method, the user terminal can perform the password-based authentication by adopting the method for the password-based authentication recorded by the above-mentioned embodiment; and the password-based trading terminal can perform the password-based authentication by adopting the method for the password-based authentication recorded by the above-mentioned embodiment, and it will not go into details here.

It can be understood by those skilled in the art that all or part of steps in the above-mentioned method can be fulfilled by programs instructing the relevant hardware components, and the programs can be stored in a computer readable storage medium such as a read only memory, a magnetic disk or an optical disk, etc. Alternatively, all or part of the steps in the above-mentioned embodiments can be implemented with one or more integrated circuits. Accordingly, each module/unit in the above-mentioned embodiments can be implemented in the form of hardware, or in the form of software function module. The present document is not limit to any specific form of the combination of the hardware and software.

It should be illustrated that the present document can further have a variety of other embodiments. Those skilled in the art can make the corresponding modifications and variations according to the present document without departing from the spirit and essence of the present document. And all of these modifications or the variations should be embodied in the scope of the appending claims of the present document.

INDUSTRIAL APPLICABILITY

The above-mentioned technical scheme transmits the password to the password-based trading terminal through the near field communication; the password is transparent to the external world, which lowers the risk that the password is stolen greatly; at the same time the device generating the password is the user terminal itself, which can avoid the password leaking caused by that the lawless person installs the steal apparatus to the password generation device.

What we claim is:

1. A user terminal for password-based authentication, comprising a password generation module, a first near field communication module, a first password management module, a user interface, a non-transitory computer readable storage medium, and a hardware processor performing instructions stored in the non-transitory computer readable storage medium; the hardware processor performing following steps using the instructions:

displaying information, which indicates "input password", to a user through the user interface, after receiving a password input by the user, generating the password by the password generation module;

converting, by the first near field communication module, the password into near field communication label data, and then sending to a password-based trading terminal through near field communication;

sending, by the password generation module, a trigger signal to the first password management module after the password is generated;

setting, by the first password management module, a valid time of the password and beginning to time under the trigger of the password generation module, and detecting whether the first near field communication module finishes sending the near field communication label data when the valid time is reached, if the first near field communication module does not finish sending the near field communication label data within the valid time, then notifying the first near field communication module to delete the near field communication label data not sent to the password-based trading terminal, and triggering the password generation module to regenerate the password; and before the password generation module regenerates the password, displaying information, which indicates "input the password again", to the user through the user interface, and waiting to receive the password input by the user;

wherein the hardware processor further performs following steps using the instructions:

when detecting that the first near field communication module finishes sending the near field communication label data when the valid time is reached, judging, by the first password management module, whether the password generation module stores the generated password, and deleting the stored password if the generated password is stored;

wherein the user terminal is comprised in a password-based authentication system comprising a password-based trading terminal, wherein the password-based trading terminal comprises a second near field communication module, a password authorization module, and a second non-transitory computer readable storage medium, and a second hardware processor performing instructions stored in the non-transitory second computer readable storage medium; the second hardware processor performing following steps using the instructions of the non-transitory second computer readable storage medium:

restoring, by the second near field communication module, near field communication label data sent by the user terminal through near field communication to the password and then sending to the password authorization module; and verifying, by the password authorization module, validity of the password from the second near field communication module;

the password-based trading terminal further comprises a second password management module, wherein the second hardware processor further performs the following step using the instructions:

after knowing that the password authorization module finishes a verification, deleting, by the second password management module, the verified password stored in the password authorization module.

2. A method for password-based authentication, used for a user terminal and a password-based trading terminal, the method comprising following steps performing by the user terminal:

displaying information, which indicates "input password", to a user through a user interface of the user terminal;

after receiving a password input by the user, generating the password; and converting the password into near field communication label data, and then sending to a password-based trading terminal through near field communication;

wherein, the method further comprises following steps performing by the user terminal:

setting a valid time of the password and beginning to time after the password is generated, and detecting whether sending the near field communication label data is finished after the valid time is reached; if sending the near field communication label data is not finished within the valid time, then deleting the near field communication label data not sent to the password-based trading terminal, and regenerating the password; wherein the regenerating the password comprises: displaying information, which indicates "input the password again", to the user through the user interface, and waiting to receive the password input by the user;

wherein the method further comprises following steps performing by the user terminal:
when detecting that sending the near field communication label data is finished after the valid time is reached, judging whether the password is stored after the password is generated; and
deleting the stored password if the password is stored after the password is generated;
wherein the method further comprises following steps performing by the password-based trading terminal:
restoring the near field communication label data sent by the user terminal through near field communication to the password;
verifying validity of the password; and
after finishing the verifying, deleting the verified password.

3. A password-based authentication system, comprising a user terminal and a password-based trading terminal
wherein the user terminal comprises a password generation module, a first near field communication module, a first password management module, a user interface, a non-transitory computer readable storage medium, and a hardware processor performing instructions stored in the non-transitory computer readable storage medium; the hardware processor performing following steps using the instructions:
displaying information, which indicates "input password", to a user through the user interface, after receiving a password input by the user, generating the password by the password generation module,
converting, by the first near field communication module, the password into near field communication label data, and then sending to a password-based trading terminal through near field communication;
sending, by the password generation module, a trigger signal to the first password management module after the password is generated;
setting, by the first password management module, a valid time of the password and beginning to time under the trigger of the password generation module, and detecting whether the first near field communication module finishes sending the near field communication label data when the valid time is reached, if the first near field communication module does not finish sending the near field communication label data within the valid time, then notifying the first near field communication module to delete the near field communication label data not sent to the password-based trading terminal, and triggering the password generation module to regenerate the password; and
before the password generation module regenerates the password, displaying information, which indicates "input the password again", to the user through the user interface, and waiting to receive the password input by the user;
wherein the hardware processor further performs following steps using the instructions:
when detecting that the first near field communication module finishes sending the near field communication label data when the valid time is reached, judging, by the first password management module, whether the password generation module stores the generated password, and deleting the stored password if the generated password is stored;
wherein the password-based trading terminal comprises a second near field communication module, a password authorization module, and a second non-transitory computer readable storage medium, and a second hardware processor performing instructions stored in the second non-transitory computer readable storage medium; the second hardware processor performing following steps using the instructions of the non-transitory second computer readable storage medium:
restoring, by the second near field communication module, near field communication label data sent by the user terminal through near field communication to the password and then send to the password authorization module; and
verifying, by the password authorization module, validity of the near field communication label data from the second near field communication module;
the password-based trading terminal further comprises a second password management module, wherein the second hardware processor further performs the following step using the instructions of the non-transitory second computer readable storage medium:
after knowing that the password authorization module finishes a verification, deleting by the second password management module, the verified password stored in the password authorization module.

* * * * *